(12) United States Patent
Hixson

(10) Patent No.: US 10,780,854 B1
(45) Date of Patent: Sep. 22, 2020

(54) PUSH BUMPER INTEGRATED WITH BIKE RACK

(71) Applicant: Jon Hixson, Santa Paula, CA (US)

(72) Inventor: Jon Hixson, Santa Paula, CA (US)

( * ) Notice: Subject to any disclaimer, the term of this patent is extended or adjusted under 35 U.S.C. 154(b) by 264 days.

(21) Appl. No.: 16/029,888

(22) Filed: Jul. 9, 2018

Related U.S. Application Data

(60) Provisional application No. 62/537,735, filed on Jul. 27, 2017, provisional application No. 62/561,526, filed on Sep. 21, 2017.

(51) Int. Cl.
  *B60R 19/48* (2006.01)
  *B60R 9/10* (2006.01)

(52) U.S. Cl.
  CPC ............. *B60R 19/48* (2013.01); *B60R 9/10* (2013.01)

(58) Field of Classification Search
  CPC .................................. B60R 19/48; B60R 9/10
  USPC ................... 293/117; 224/489, 490; 280/769
  See application file for complete search history.

(56) References Cited

U.S. PATENT DOCUMENTS

| | | | |
|---|---|---|---|
| 3,367,548 A | 2/1968 | Cooper | |
| 4,128,195 A * | 12/1978 | Collins | B60R 9/10 224/532 |
| 5,579,972 A | 12/1996 | Despain | |
| 6,045,022 A | 4/2000 | Giles | |
| 6,113,164 A | 9/2000 | Setina | |
| 6,318,773 B2 | 11/2001 | Storer | |
| 6,905,153 B2 | 6/2005 | Murray | |
| 6,968,986 B1 | 11/2005 | Lloyd et al. | |
| 7,290,670 B2 | 11/2007 | Huang | |
| 7,784,656 B2 | 8/2010 | Morrill et al. | |
| 7,806,308 B2 | 10/2010 | Gunn | |
| 2005/0057052 A1 * | 3/2005 | Exline | B60R 19/00 293/117 |
| 2006/0028036 A1 * | 2/2006 | Chuang | B60R 19/48 293/117 |
| 2009/0266857 A1 * | 10/2009 | Dennis | B60R 13/00 224/489 |

* cited by examiner

*Primary Examiner* — Joseph D. Pape
(74) *Attorney, Agent, or Firm* — Sandy Lipkin

(57) ABSTRACT

A combination push bumper/bike rack for use with police or other emergency vehicles for situations when a disabled vehicle may need pushing, a bike may need to be transported or both. The push bumper is attached to the original bumper of a vehicle and spaced in front of such original bumper to prevent damage to the vehicle when it pushes other vehicles. At the top portion of the push bumper are a pair of retractable arms with straps that can be deployed using a push button. When the retractable arms are not in use they remain flush with the push bumper. When the retractable arms are deployed that are positioned substantially perpendicular to the push bumper and are capable of carrying a bicycle thereon with straps to secure them thereto.

6 Claims, 8 Drawing Sheets

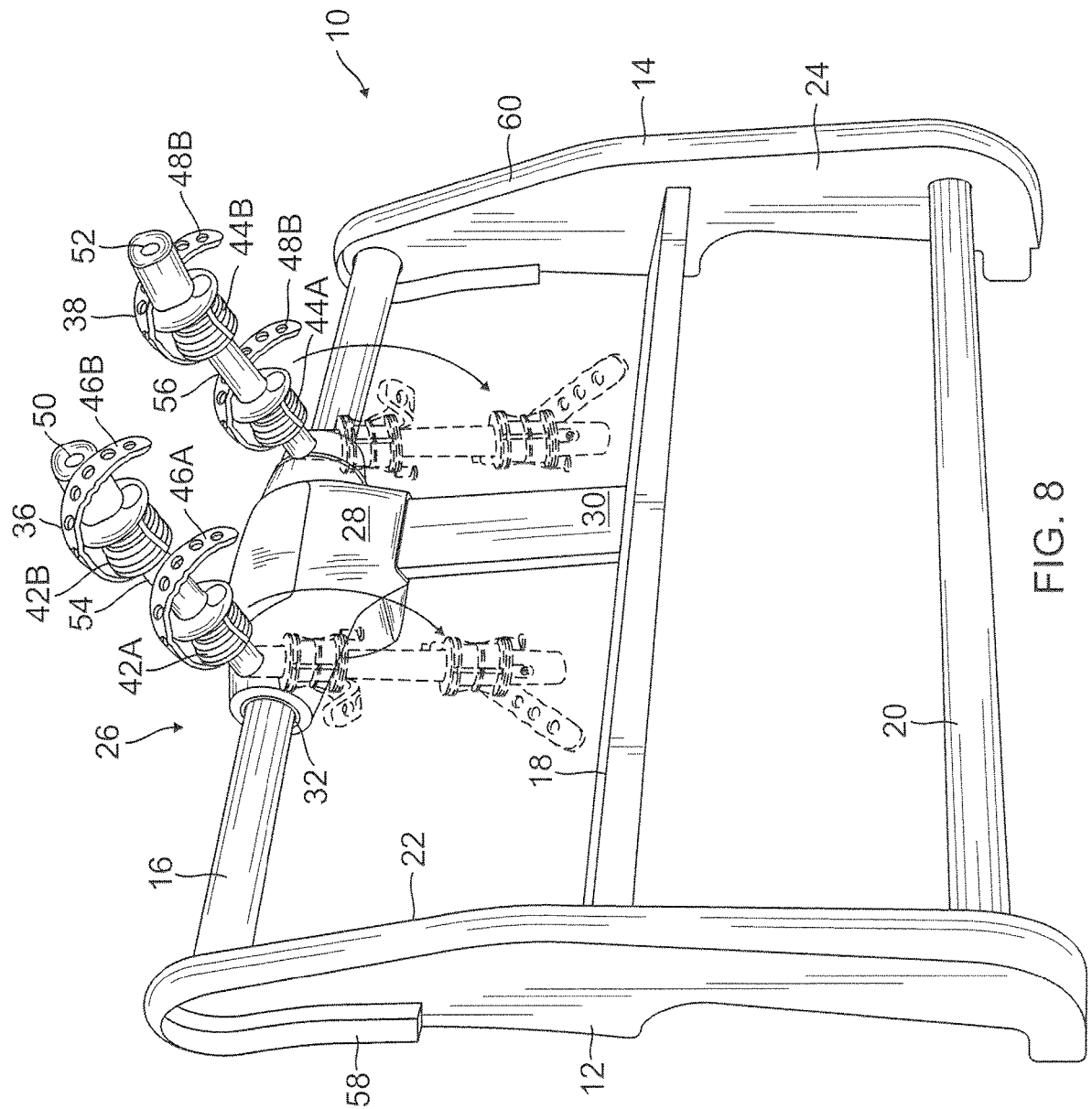

PUSH BUMPER INTEGRATED WITH BIKE RACK

REFERENCE TO PRIOR APPLICATION

This application claims priority of the provisional patent application 62/537,735, filed Jul. 27, 2017 entitled PUSH BUMPER WITH BIKE RACK by Jon Hixson and provisional patent application 62/561,526, filed Sep. 21, 2017 entitled PUSH BUMPER INTEGRATED WITH BIKE RACK by Jon Hixson.

BACKGROUND OF THE INVENTION

Field of the Invention

The field of this invention relates generally to the field of bicycle carriers for automobiles and other motor vehicles, and more particularly toward the attachment of a functional bike rack to a front-mounted auxiliary push bumper.

Description of the Prior Art

It is often the case that law enforcement officers and operators of emergency vehicles need to transport bicycles in the course of their duties. Typically, when this situation arises, officers and operators of emergency vehicles used either trunk mounted bike racks or simply stowed bicycles in the open trunk of their emergency vehicle. This method of transportation required the officer to use a bungee cord or similar type strap to secure the bicycle inside the open vehicle trunk. Transporting cargo with an open trunk was both dangerous and damaging to the cargo and contents of the vehicle trunk.

Additionally, when disabled vehicles which for one reason or other need to be moved, push bumpers are utilized by law enforcement officers and operators of emergency vehicles to move said disabled vehicles out of the way so as not to be a hazard to traffic and roadways.

Some prior art patents have dealt with the use of push bumpers as well as the use of bike racks on vehicles. For example, U.S. Pat. No. 6,905,153 issued to Murray, et al. sets forth a PUSH BUMPER having a pair of vertical structural members together with apparatus for securing the vertical members to a conventional vehicle bumper. The vertical members are joined by a generally planar cross member which defines a generally V-shaped frontal portion.

U.S. Pat. No. 6,113,164 issued to Setina sets forth an AUXILIARY PUSH BUMPER FOR MOTOR VEHICLE which is clamped to the original bumper of the host vehicle by brackets attached to the bumper guards on the push bumper. The push bumper is fabricated of a plurality of bumper sections formed of extruded aluminum and having ends which are releasably attached to the bumper guards for easy repair of the push bumper. In one embodiment, the push bumper includes a center section formed of extruded aluminum U-shaped channel with a diagonal stiffening plate inserted into the channel. The center section is fastened as its opposed ends to a pair of bumper guards. A pair of curved side sections are fastened at their inner ends to the bumper guard plates and are further fastened at their outer ends to the frame of the host vehicle.

U.S. Pat. No. 6,318,773 issued to Storer sets forth a PUSH BAR MOUNTING SYSTEM for mounting a push bar to a vehicle bumper without significant damage to the bumper. The system includes a front and rear bracket mounted to an inner bumper of the host vehicle and having top and bottom mounting tabs extending away from the inner bumper of the vehicle without drilling mounting holes therein. Additionally, the mounting tabs are configured to extend through a bumper fascia that surrounds the inner bumper.

U.S. Pat. No. 5,579,972 issued to Despain sets forth a BICYCLE CARRIER as an apparatus for carrying bicycles on a vehicle including a trunnion fitted to a rear receiver or other mount secured to a vehicle. A base extends from the trunnion longitudinally away from the vehicle to carry a post having top and bottom supports extending away for supporting bicycles. One or more trays may extend laterally across the lower support with respect to the base. Each tray may be adapted to support the rear tires of two bicycles. The upper support may be an arm having adjustable blocks for mounting the open (free) ends of the tines of the forks of the bicycles. Each block is slotted to receive and position a skewer passing through a fork. The skewer may be position able along a length of a block, to adjust to the length of a bicycle. The blocks may be mounted in a different orientation (e.g. upside down) to further adjust for bicycle length. Trays and blocks may be arranged to offset every bicycle from every other bicycle in three dimensions to avoid interference of handlebars and pedals. Additional brackets are attachable to the top support for securing skis, waterskies, snowboards, surf boards, and the like. Such equipment may stand on resilient pads positioned in the trays. The base or trunnion may be adapted to attach an extension, a hitch, a cargo rack or the like. The apparatus may be removed from the vehicle and placed on a support surface to operate as a storage rack. A vise mount secured to the post may removably secure a bicycle vise for holding a bicycle during repair and adjustment.

U.S. Pat. No. 7,290,670 issued to Huang sets forth a BIKE RACK HAVING QUICK FOLDING/UNFOLDING FUNCTION as a bike rack that included two main arms, two links and a locking mechanism. The locking mechanism includes a first pivot member pivotally mounted on a first main arm, a second pivot member pivotally mounted on a second main arm and pivotally connected with the first pivot member, and a control handle secured to the second pivot member to drive the locking mechanism to expand and fold the two main arms. Thus, the control handle is held by a user's one hand to operate the locking mechanism so as to lock and unlock the bike rack, thereby facilitating the user mounting and detaching the bike rack.

U.S. Pat. No. 6,045,022 to Brian. A. Giles discloses a carrier for transporting bicycles on the front of a motor vehicle allowing unrestricted access to the vehicle trunk, rear cargo area, and top luggage rack. Carrier frame has a horizontal crossmember and two vertical uprights. Two removable bicycle support arm assemblies with safety tips extend forward from the crossmember. A protector sleeve as part of arm assembly protects bicycle finish at point of contact. An adaptable system comprised of elastic cord assemblies and eyebolts secures bicycles to the carrier. Carrier mounts to vehicle at top surface of grill and front surface of bumper—four points, mirror image. Customdesigned mounting kits accommodate carrier to a multitude of vehicle makes and models while maintaining a low forward profile for Carrier and bicycle. Eyebolts serve as structural members, a system component for securing bicycles, attaching hardware, and a safety feature. An additional embodiment for frame-mounting of the carrier is disclosed for vehicles where bumper-mounting is not practical.

U.S. Pat. No. 7,806,308 to George W. Gunn discloses a quick connection and release assembly for releasably mounting a bicycle rack on the bumper of a motor vehicle. The assembly includes a bumper plate structure adapted to be fixedly secured to the bumper by fasteners and defining at least one tongue extending upwardly from an upper edge thereof and a bicycle rack plate structure adapted to be fixedly secured to a rear face of the bike rack base plate by fasteners and including an aperture proximate an upper edge thereof sized to receive the tongue and retractable pins proximate lower side edges thereof for positioning behind a lower edge portion of the bumper plate structure.

U.S. Pat. No. 7,784,656 to Daniel D. Morrill, et al. discloses a bumper and bike rack assembly especially suitable for use as the front bumper assembly of a bus. The assembly includes a rigid structural member adapted to extend transversely of the bus and defining a series of laterally spaced slots extending vertically in a front wall of the member; a rubberized fascia member including a vertical front wall spaced forwardly of the front wall of the structural member and constituting the forward contact surface for the bumper and a series of laterally spaced notches respectively aligned with the slots in the structural member; and a bike rack including laterally spaced pivot arms each having a lower pivot end journaled on the structural member rearwardly of the front wall of the structural member and below a top wall of the structural member and extending from the pivot end outwardly through a respective slot in the structural member front wall and through an aligned notch in the fascia member for connection to a main body structure of the rack whereby to mount the rack for pivotal movement between a working position in which the pivot arms extend forwardly through the slots and aligned notices in the fascia to position the main body of the rack forwardly of the fascia and a raised, stowed position in which the pivot arms extend upwardly through the slots to position the rack above the fascia and rearwardly of the forward contact surface of the bumper.

U.S. Pat. No. 3,367,548 to Frank H. Cooper discloses a motorcycle carrier rack incorporating auxiliary headlights for mounting on the front bumper of an automobile in which the motorcycle is carried in a transverse channel, and the headlights are vertically adjustable on a pair of vertical bracket structures, channel and brackets being combined in a rigid unit which is mated to the support structures of the automobile bumper.

U.S. Pat. No. 6,968,986 to Jeffrey M. Lloyd, et al. discloses a bicycle rack for connection to a vehicle, and especially a bus for the transport of a bicycle. The bicycle rack has a frame pivotally connected to a bracket, which is connectable to a front of a bus. A pair of elongate cradles traverse the frame of rack. Each elongate cradle is capable of receiving a bicycle. Each elongate cradle includes a rear wheel cradle and a front wheel cradle. The front wheel cradle has a spring-operated wheel lock. The wheel lock includes a rotatable armature which overlays and holds the front tire of the bicycle in a locked position. The armature is actuated by the weight of the front wheel or by the manual activation of an adjacent handle.

It is the object of the instant invention to provide a push bumper that integrates a bike rack.

It is a further object of the instant invention to provide that the arms of the bike rack on the integrated push bumper be retractable so as to move out of harm's way when no bicycle is being transported and allow the push bumper aspect is to be utilized.

It is a further object of the instant invention to provide for an easy push locking mechanism or rotating hinge for selectively transitioning the bike rack assembly from an "extended" in-use position as a bike rack and a "stow away" position when the bike rack portion is not in use to allow for the use as a push bumper or simply to keep the retractable arms out of harm's way.

SUMMARY OF THE INVENTION

The use of a bicycle carrier system attached to a motor vehicle has been developed and improved over many years. Previous inventions and improvements focused mainly on the rear mounting systems for vehicles. However, law enforcement and other emergency vehicles have never been properly equipped to transport bicycles. Frequently, law enforcement officers are called upon to secure and transport bicycles for a variety of reasons. After an arrest is made, if the offender is in possession of a bicycle, the officer must take possession of the offender's property and secure the property. This includes the offender's bicycle that is problematic to transport to a secure facility like police headquarters. Additionally, many police departments utilize officers in a bike patrol capacity. At times, the police bicycles are stored in a facility that is many miles from the deployment area. This requires police officers to transport the police bicycles from the station or storage facility to a location for deployment.

With the instant invention law enforcement and emergency vehicle operators will have the ability to safely and conveniently secure and transport bicycles.

Furthermore, the instant invention can be modified to mount on off-road vehicles or installed on any vehicle when there is a need for front-mounted bike racks.

The basic embodiment of the present invention teaches a combination push bumper and bike rack system comprising: a first vertical support; a second vertical support; a top horizontal support connecting said first and second vertical supports; a middle horizontal support connecting said first and second vertical supports; a bottom horizontal support connecting said first and second vertical supports; a bike rack comprising a top portion and one or more supporting members wherein said top portion is attached to said top horizontal support through first and second apertures in said top portion and wherein said one or more supporting members is attached to said middle horizontal support, said bike rack further comprising: a first retractable arm; a second retractable arm; and wherein said first and second retractable arms are movable between a first closed and stored position flush with said first and second vertical supports and a second, deployed and open position substantially perpendicular to said first and second vertical supports.

The above embodiment can be further modified by defining that an activating button activates button spring clips to move said first and second retractable arms between said first closed position and said second, deployed and open position.

The above embodiment can be further modified by defining that a rotating hinge move said first and second retractable arms between said first closed position and said second, deployed and open position.

The above embodiment can be further modified by defining that said first and second retractable arms include a pair of cushions thereby creating cradles for the placement thereon of a bicycle.

The above embodiment can be further modified by defining that said first and second retractable arms include one or more straps for securing of a bicycle thereto.

The above embodiment can be further modified by defining that said first and second retractable arms terminate in a rubber portion.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 8 is a front/lower perspective view of the combination push bumper/bike rack of the instant invention showing the bike rack arms in the open and deployed position and also in phantom in the closed and stored position showing the direction of rotation between the two positions of the bike rack arms.

DETAILED DESCRIPTION OF A PREFERRED EMBODIMENT

Figure 1:
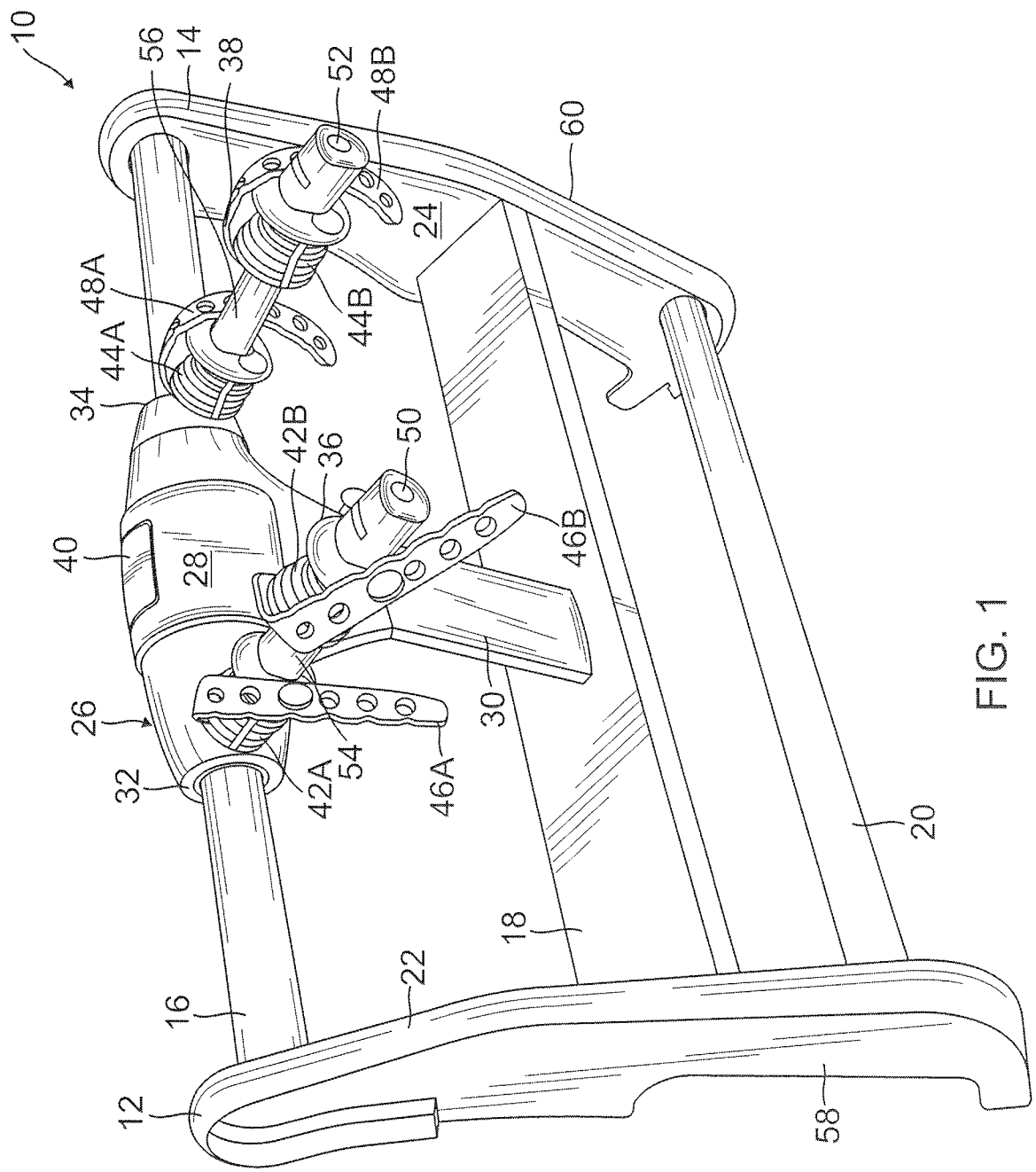
FIG. 1 is a front/upper perspective view of the combination push bumper/bike rack of the instant invention with the bike rack arms in the open and deployed position.
Figure 2:
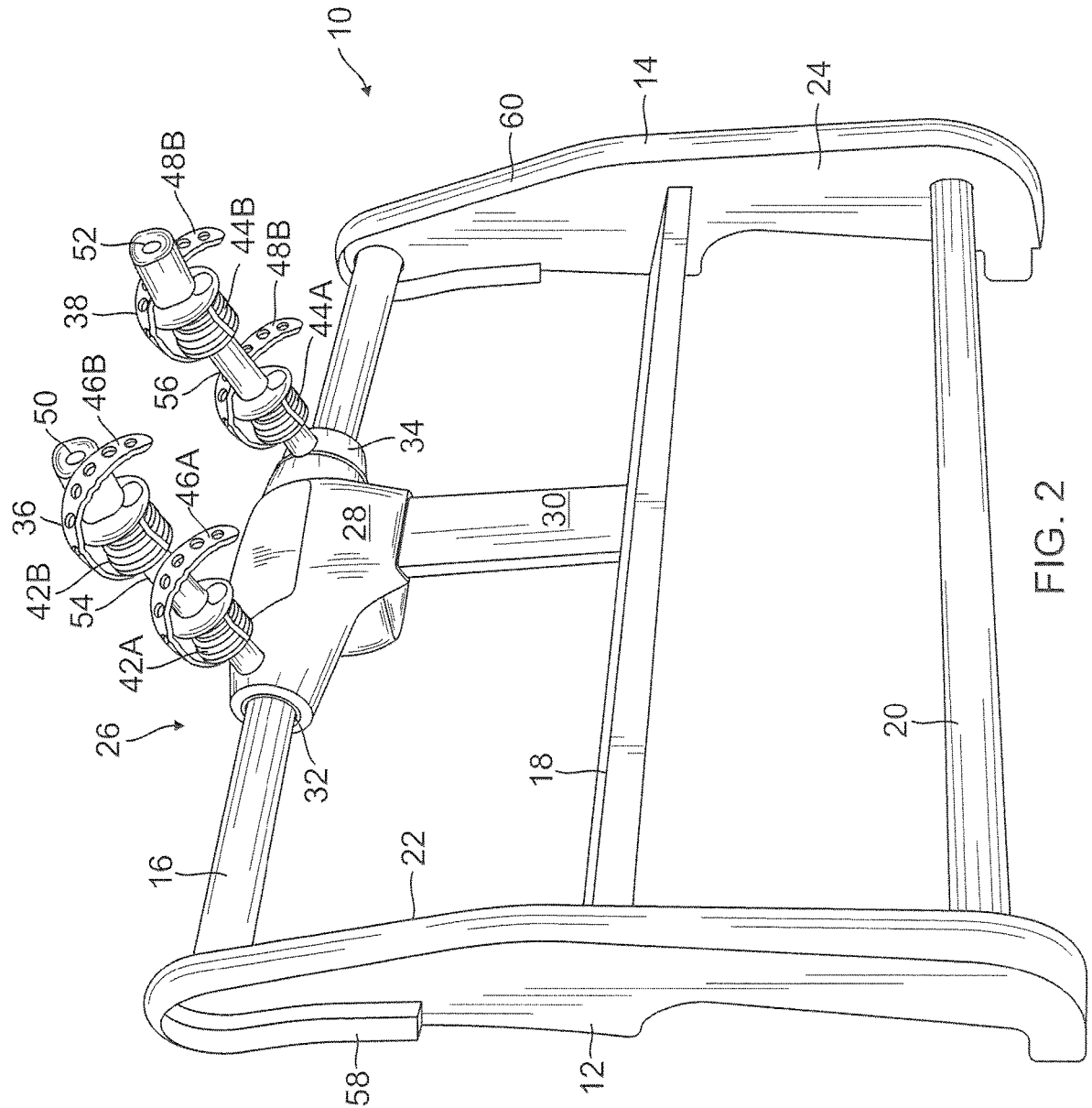
FIG. 2 is a front/lower perspective view of the combination push bumper/bike rack of the instant invention with the bike rack arms in the open and deployed position.
Figure 3:
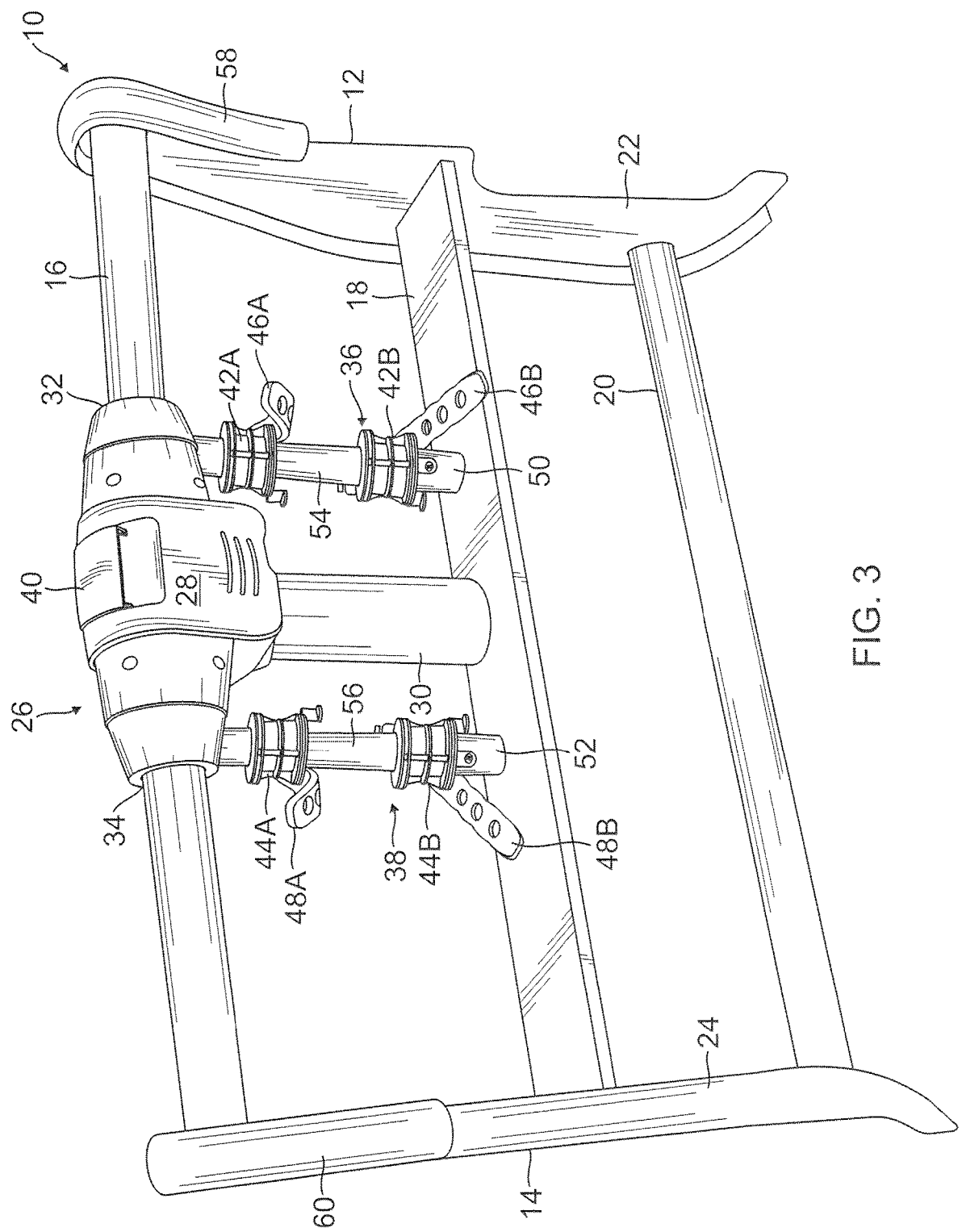
FIG. 3 is a rear perspective view of the combination push bumper/bike rack of the instant invention with the bike rack arms in the closed and stored position.
Figure 4:
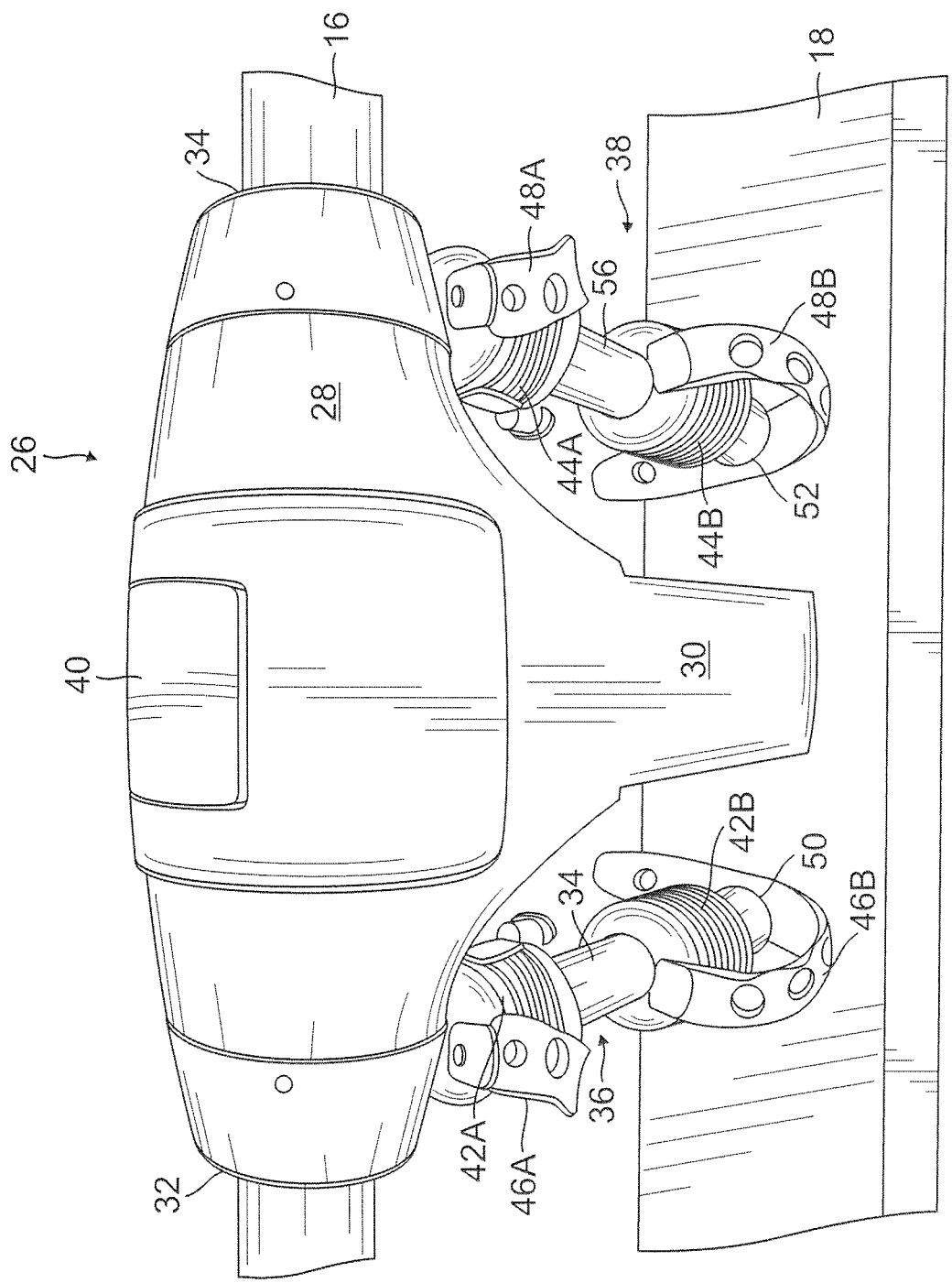
FIG. 4 is a top view of the portion of the combination push bumper/bike rack of the instant invention that allows for the bike rack arms to moved between the open, deployed and closed, storage position.
Figure 5:
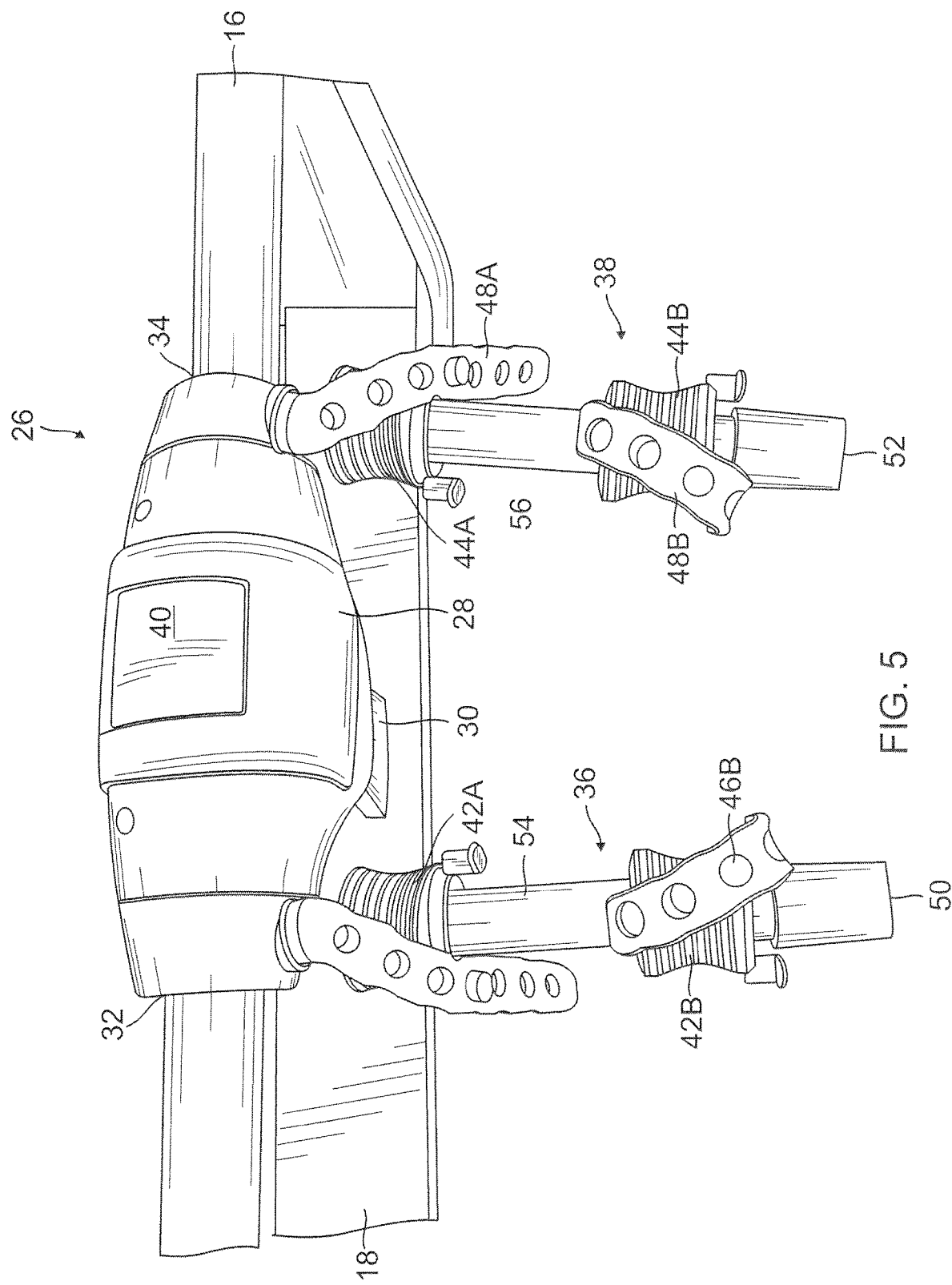
FIG. 5 is a top view of the portion of the combination push bumper/bike rack of the instant invention with the bike rack arms in the open and deployed position.
Figure 6:
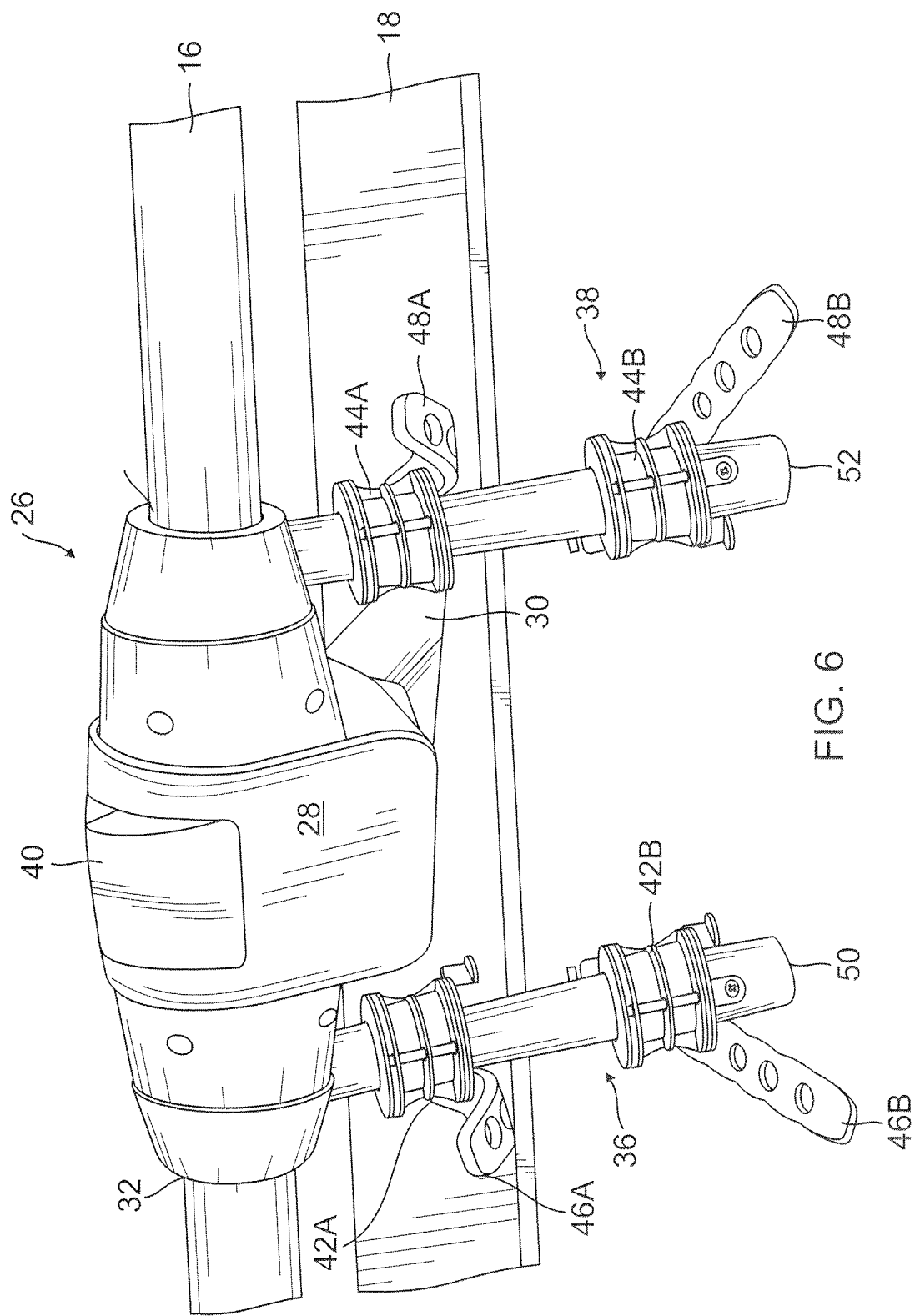
FIG. 6 is a front perspective view of the portion of the combination push bumper/bike rack of the instant invention with the bike rack arms in the open and deployed position.
Figure 7:
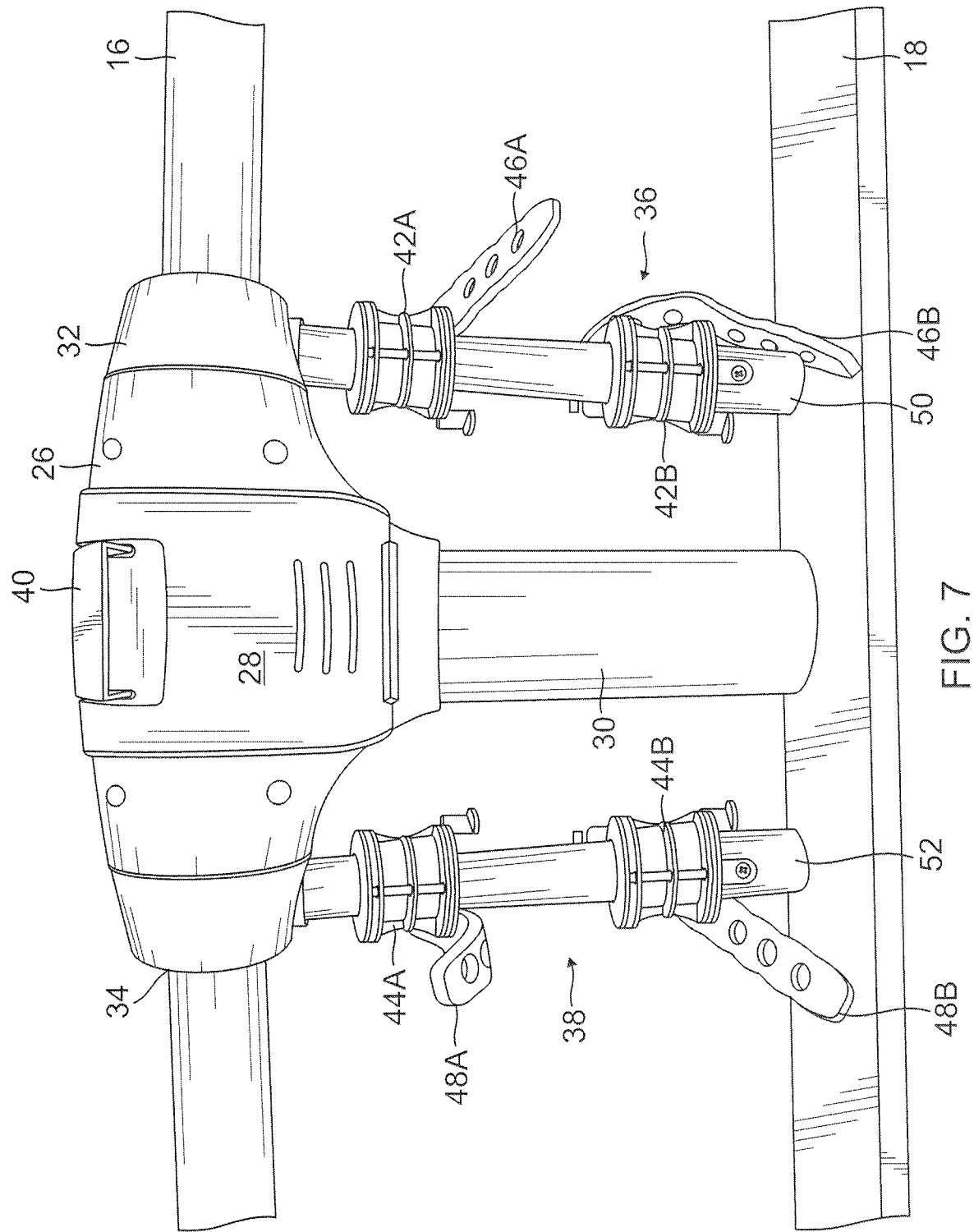
FIG. 7 is a rear view of the portion of the combination push bumper/bike rack of the instant invention with the bike rack arms in the closed and storage position.

Turning to the drawings, the preferred embodiment is illustrated and described by reference characters that denote similar elements throughout the several views of the instant invention.

The preferred embodiment of the instant invention provides for an auxiliary push bumper 10 that is attached to the original bumper of a vehicle (not shown) and spaced in front of such original bumper to prevent damage to the vehicle when it pushes another vehicle. Police and other emergency vehicles may use such push bumper 10 because they are frequently used by officers to push other vehicles that become stuck or disabled. The auxiliary push bumper 10 of the present invention may be constructed of several extruded aluminum sections so that it is strong, lightweight and easily repaired when damaged. The auxiliary push bumper 10 is affixed to the original bumper of the vehicle by brackets attached to a pair of vertical bumper guards 12, 14 fastened to the opposite ends of the horizontal center sections 16, 18, 20 of such push bumper 10. Also, in one embodiment, two vertical sections 12,14 of the push bumper 10 are secured at their inner ends 22, 24 to the frame of the vehicle to provide a strong auxiliary bumper assembly. The two vertical sections 12, 14 of the push bumper 10 are protected on the outer edges 58, 60 with heavy duty rubber strips. The auxiliary push bumper 10 may be outfitted with additional lights (not shown) including a pair of side lights mounted to the bumper guards and/or a pair of front lights mounted to the top center section of the push bumper 10.

With the present invention, the auxiliary push bumper 10 may also be outfitted with a folding bike rack assembly 26 affixed to the top center section 28 of the push bumper 10. The bike rack assembly 26 is centered on the upper horizontal section 16 of the push bumper 10 wherein the top horizontal section 16 of the push bumper 10 fits through first and second apertures 32, 24 in the top portion 28 of the bike rack assembly 26 and constructed of similar material as the push bumper 10 to be strong, lightweight and easily repaired when damaged. One or two vertical bike rack support structures 30 can be attached to the bike rack assembly 26 between the top horizontal section 16 of the push bumper 10 and the center horizontal section 18 of the push bumper 10. This vertical support 30 will serve to assist with distribution of weight when bicycles are loaded onto the bike rack assembly 26.

The bike rack assembly 26 is constructed of two similar extruded aluminum independent arms 36, 38 with two locking positions. The arms 36, 38 are held in the locked and deployed position with button spring clips activated by the push button 40 found on the top portion 28 of the bike rack assembly 26 or a rotating hinge and may be selectively transitioned between the two positions. In the "extended" position, both arms 36, 38 of the bike rack assembly 26 are extended away from the auxiliary push bumper 10 and locked in a horizontal position. In this position, bicycles can be loaded and secured to the bike rack assembly 26 for transportation. The bicycles are easily secured to the bike rack arms 36, 38 in a pair of cradles on each arm 42A, 42B, 44A, 44B and held in place with rubber straps 46A, 46B, 48A, 48B on each arm 36, 38. The cap ends 50, 52 of each arm 36, 38 are likewise made of a cushioning rubber.

In the "stow-away" position, both arms 36, 38 of the bike rack assembly 26 are folded vertically and locked in place behind the plane of the pair of vertical bumper guards 12, 14. The auxiliary push bumper 10 outfitted with a bike rack assembly 26 may continue to be used by police and other emergency vehicles when the bike rack assembly 26 is folded into the "stow-away" position.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A combination push bumper and bike rack system comprising:
    a first vertical support;
    a second vertical support;
    a top horizontal support connecting said first and second vertical supports;
    a middle horizontal support connecting said first and second vertical supports;
    a bottom horizontal support connecting said first and second vertical supports;
    a bike rack comprising a top portion and one or more supporting members wherein said top portion is attached to said top horizontal support through first and second apertures in said top portion and wherein said one or more supporting members is attached to said middle horizontal support, said bike rack further comprising:
    a first retractable arm;
    a second retractable arm; and
    wherein said first and second retractable arms are movable between a first closed and stored position flush with said first and second vertical supports and a second, deployed and open position substantially perpendicular to said first and second vertical supports.

2. The combination push bumper and bike rack system as defined in claim 1 wherein an activating button activates button spring clips to move said first and second retractable arms between said first closed position and said second, deployed and open position.

3. The combination push bumper and bike rack system as defined in claim 1 wherein a rotating hinge move said first and second retractable arms between said first closed position and said second, deployed and open position.

4. The combination push bumper and bike rack system as defined in claim 1 wherein said first and second retractable arms include a pair of cushions thereby creating cradles for the placement thereon of a bicycle.

5. The combination push bumper and bike rack system as defined in claim 1 herein said first and second retractable arms include one or more straps for securing of a bicycle thereto.

6. The combination push bumper and bike rack system as defined in claim 1 wherein said first and second retractable arms terminate in a rubber portion.

* * * * *